United States Patent
Shah

(10) Patent No.: US 10,678,660 B2
(45) Date of Patent: Jun. 9, 2020

(54) TRANSFORMATION DRIFT DETECTION AND REMEDIATION

(71) Applicant: StreamSets, Inc., San Francisco, CA (US)

(72) Inventor: Rupal Jatinkumar Shah, San Francisco, CA (US)

(73) Assignee: StreamSets, Inc., San Francisco, CA (US)

( * ) Notice: Subject to any disclaimer, the term of this patent is extended or adjusted under 35 U.S.C. 154(b) by 147 days.

(21) Appl. No.: 16/018,623

(22) Filed: Jun. 26, 2018

(65) Prior Publication Data
US 2019/0391887 A1    Dec. 26, 2019

(51) Int. Cl.
| G06F 11/00 | (2006.01) |
| G06F 11/14 | (2006.01) |
| G06F 9/38  | (2018.01) |
| G06F 9/54  | (2006.01) |

(52) U.S. Cl.
CPC ........ *G06F 11/1492* (2013.01); *G06F 9/3861* (2013.01); *G06F 9/544* (2013.01); *G06F 11/1438* (2013.01)

(58) Field of Classification Search
CPC ............ G06F 11/1492; G06F 11/1438; G06F 11/004; G06F 11/008; G06F 11/0703; G06F 11/142; G06F 11/1479; G06F 11/1489; G06F 11/16; G06F 11/1608; G06F 11/1641; G06F 11/165; G06F 11/1658; G06F 9/3861; G06F 9/544; G06F 9/3867; G06F 9/3869; G06F 9/3871; G06F 9/54; G06F 9/546
See application file for complete search history.

(56) References Cited

U.S. PATENT DOCUMENTS

| 9,678,850 | B1* | 6/2017 | Rickard | G06F 16/1734 |
| 10,409,802 | B2* | 9/2019 | Spitz | G06F 16/2365 |
| 2016/0364434 | A1* | 12/2016 | Spitz | G06F 16/248 |
| 2017/0124464 | A1* | 5/2017 | Crabtree | G06F 9/544 |
| 2018/0181957 | A1* | 6/2018 | Crabtree | H04L 63/0421 |

* cited by examiner

*Primary Examiner* — Anthony J Amoroso
(74) *Attorney, Agent, or Firm* — Schwegman Lundberg & Woessner, P.A.

(57) ABSTRACT

In various example embodiments, a system, computer-readable medium and method to detect and dynamically correct a transformation drift in a data pipeline, the method comprising detecting a change in a transformation performed by an upstream subsystem of the data pipeline on a data field of an output dataset of the upstream subsystem; classifying the data field as an impacted data field; identifying, based on the topology information, a downstream subsystem of the data pipeline downstream of the upstream subsystem; identifying an input dataset of the downstream subsystem including the impacted data field; and performing a corrective transformation on the impacted data field of the input dataset of the downstream subsystem

20 Claims, 4 Drawing Sheets

TRANSFORMATION DRIFT DETECTION AND REMEDIATION

TECHNICAL FIELD

The subject matter disclosed herein generally relates to the technical field of special-purpose machines that provide for real-time detection and remediation of transformation drift, in a data pipeline, comprising software-configured computerized variants of such special-purpose machines and improvements to such variants, and to the technologies by which such special-purpose machines become improved compared to other special-purpose machines that provide for real-time detection and remediation of transformation drift in a data pipeline.

BACKGROUND

A data pipeline is a set of one or more coupled data pipeline subsystems ("subsystems") that process and/or transform data extracted from data sources and for providing the processed data to data sinks. Data that passes through the data pipeline system may undergo multiple data transformation operations ("transformations"). A transformation can have dependencies on transformation(s) that precede it. The data involved in any transformation must remain meaningful for the downstream systems. For example, if elements of an upstream transaction data set like a credit card number or expiration date are to be obfuscated or replaced, then, if within one of the downstream application there is a feature that performs credit-card algorithm validation checks, that function must still be allowed to operate without error and operate as expected. According to conventional approaches for maintaining data pipelines, a system administrator configures and updates the subsystems so that the data involved in any transformation is meaningful for the application logic of the downstream subsystems. If a transformation is added, removed, or changed in an upstream subsystem, the system administrator must manually reconfigure the downstream subsystems to compensate for the change of transformation in the upstream subsystem. Conventional approaches for maintaining data pipelines therefore require significant human resources.

BRIEF DESCRIPTION OF THE DRAWINGS

Various ones of the appended drawings merely illustrate example embodiments of the present disclosure and cannot be considered as limiting its scope.

Figure 1:
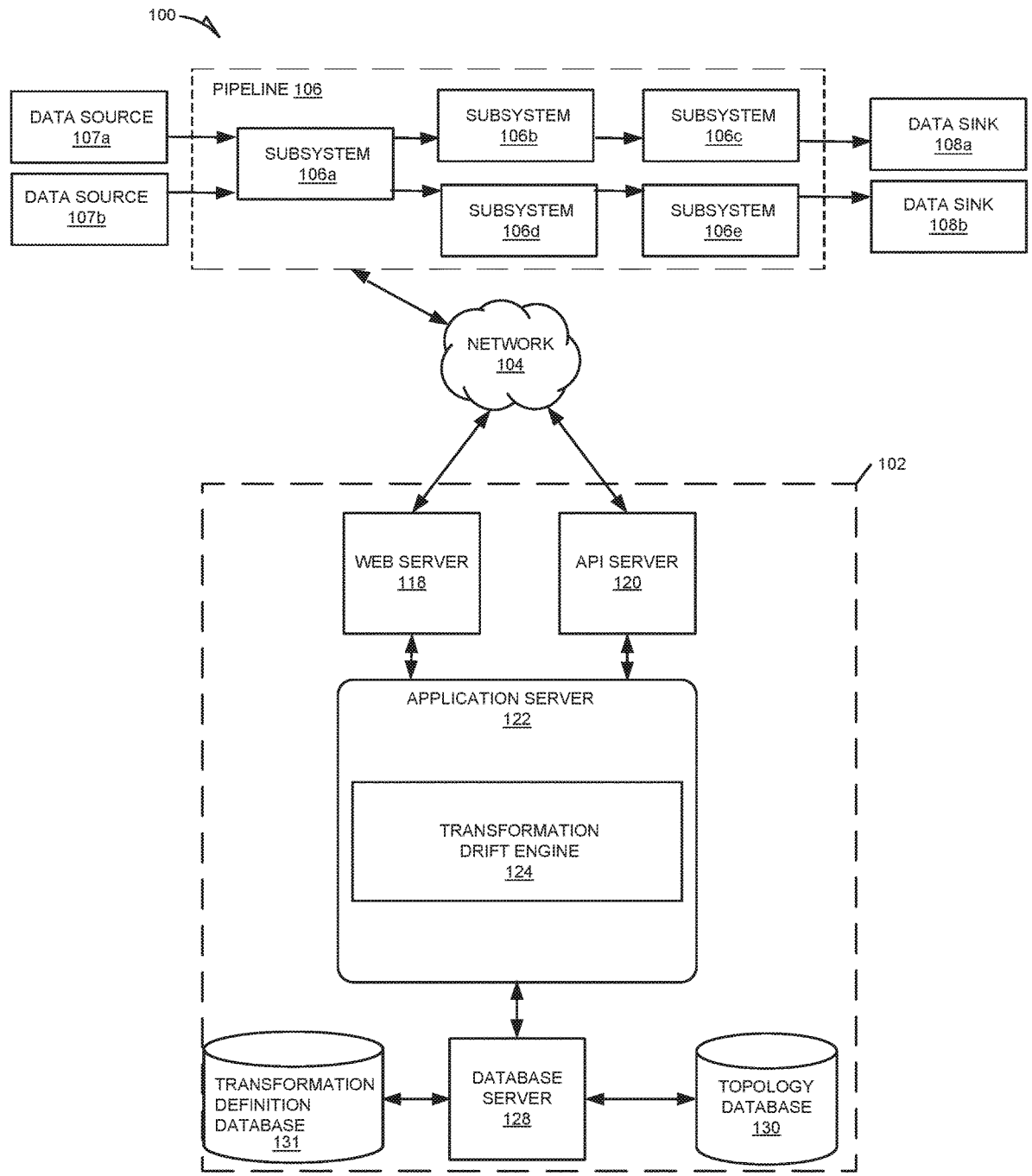
FIG. 1 is a network diagram depicting a computer system, within which one example embodiment of a transformation drift engine may be deployed, according to an example embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details in general, well-known instruction instances, protocols, structures, and techniques are not necessarily shown in detail.

A system, a non-transitory computer-readable storage medium storing instructions, and a computer-implemented method described herein are directed to a transformation drift engine to dynamically identify and correct a transformation drift in a data pipeline. A data pipeline is a set of one or more coupled subsystems that process and/or transform received data. Each subsystem may perform one or more transformation(s). However, one or more upstream system(s) can be updated such that a transformation performed on an output dataset of an upstream subsystem is added, removed, or changed. Once the transformation change has occurred, the semantic content of the output dataset transformed by the updated upstream system might no longer be meaningful to the downstream system(s). This misalignment is caused by a transformation drift or semantic drift between data in the upstream system(s) and in the downstream system(s). The drift can create issues for the downstream subsystem, such as misformatted or incomplete data, that can cause the downstream subsystem to fail or suffer from degraded performance and/or storage of the data in a data sink to be invalid. The transformation drift engine detects the change in the transformation performed by the upstream subsystem and classifies the data field on which the changed transformation is performed as an impacted data field. The transformation drift engine identifies, based on the topology information, a subsystem downstream of the upstream subsystem and identifies an input dataset of the downstream subsystem of the data pipeline comprising the impacted data field. The transformation drift engine performs a corrective transformation on the impacted data field of the input dataset of the downstream subsystem.

It is understood that transformation drift is distinct from "schema drift". While schema drift deals with the addition, removal, or type changes of data fields, transformation drift occurs when the character of data in data fields changes without structural changes of the data fields.

It is understood that various embodiments further include encoded instructions that comprise operations to generate a user interface(s) and various user interface elements. The user interface and the various user interface elements can he displayed to be representative of transformations, transformation drifts, data field, data sets, etc.

It is understood that various embodiments include the generation of one or more modules that comprise source code that, when compiled by a computing device(s), creates object code that causes the computing device(s) to perform one or more operations described herein. In other embodiments, any of the modules comprise object code that causes the computing device(s) to perform various operations described herein. In some embodiments, each module(s) can he permanently configured circuitry, such as ASICs, etc. In various embodiments, all operations of the transformation drift engine can he performed by a computer system, or computer module(s), or software modules situated between a plurality of data storage systems, such that the transformation drift engine accesses data records being transmitted between the plurality of data storage systems.

Other embodiments include the generation of one or more modules that comprise source code that, when compiled by a server computing device(s), creates object code that causes the server computing device(s) to perform one or more operations described herein in communication with one or more client computing devices. In other embodiments, any of the modules comprise object code that causes the server computing device(s) to perform various operations described herein in communication with the one or more client computing devices.

Turning now to FIG. 1, FIG. 1 is a network diagram depicting a computer system 100, within which one example embodiment of a transformation drift engine may be deployed, according to some embodiments of the invention. A data pipeline 106 is a set of one or more coupled subsystems 106a-106e that process and/or transform data extracted from data source(s) 107a-107b and provide the processed data to data sink(s) 108a-108b. A transformation may be defined as a set of computer commands or instructions which, when executed by a subsystem 106a-106e, transforms one or more input dataset(s) to produce one or more output dataset(s). Transformations may include data masking and data filtering. Data masking or data obfuscation is the process of hiding original data with random characters or data. The format of data remains the same; only the values are changed. A reason for applying masking to a data field can be to protect data that is classified as personal or commercially sensitive data, when the data must remain usable for the downstream subsystems. Data-masking techniques may include techniques such as substitution, shuffling, numeric variance, encryption, nulling out or deletion, character scrambling or masking out of certain fields. Transformations may include any sort of mathematical function, like encryption. Transformations may include any sort of text manipulation, like removing whitespace character, uppercasing or lowercasing. Data that passes through the data pipeline system may undergo multiple transformations. The data pipeline 106 may have a branching nature. An upstream subsystem performs one or more transformation(s) on one or more data field(s) of one or more of its input dataset(s), and forward one or more output dataset(s) to one or more downstream system(s). A subsystem is downstream of an upstream subsystem if at least one of its input data sets includes data that was transformed by the upstream subsystem.

A networked system 102, in the example, provides server-side functionality, via a network 104 (e.g., the Internet or Wide Area Network (WAN)) to the data pipeline 106. FIG. 1 illustrates, for example, an Application Program Interface (API) server 120 and a web server 118 are coupled to and provide programmatic and web interfaces respectively to an application server(s) 122. The application server 122 hosts a transformation drift engine 124. The application server 122 is, in turn, shown to be coupled to a database server(s) 128 that facilitates access to a topology database(s) 130, which stores topology information of the data pipeline 106, and a transformation definition database 131, which stores transformation information. In other embodiments, the transformation drift engine 124 can be coupled to a topology cache, which stores topology information of the data pipeline 106, and a transformation definition cache, which stores transformation information.

While the transformation drift engine 124 is shown in FIG. 1 to form part of the networked system 102, it will be appreciated that, in alternative embodiments, the transformation drift engine 124 may form part of a service that is separate and distinct from the networked system 102.

Further, the computer system 100 is of course not limited to such an architecture as shown in FIG. 1, and could equally well find application in a distributed, or peer-to-peer, architecture system, for example. Any portion, or portions, of the transformation drift engine 124 may reside and be executed from any kind of computing device. The transformation drift engine 124 could also be implemented as standalone software program(s), which does not necessarily have networking capabilities.

Figure 2:
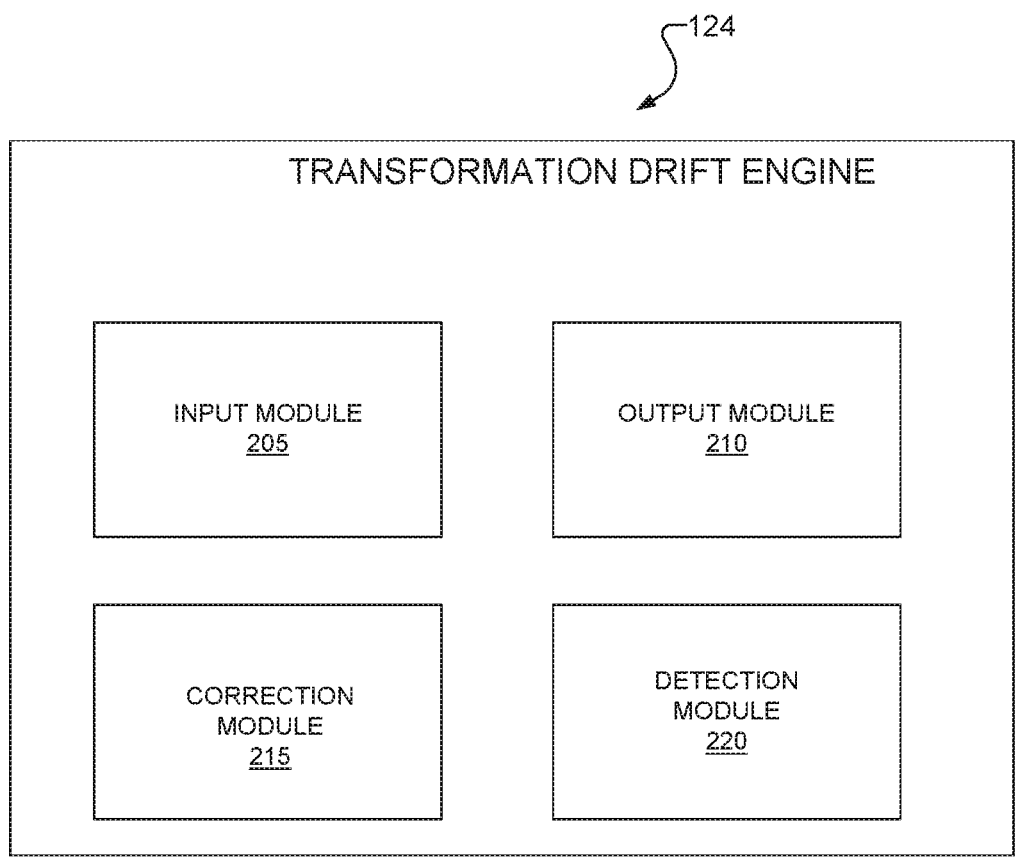
FIG. 2 is a block diagram showing example components of a transformation drift engine, according to some embodiments.

FIG. 2 is a block diagram showing example components of the transformation drift engine 124, according to some embodiments. The transformation drift engine may include an input module 205, an output module 210, a detection module 220, and a correction module 215.

The input module 205 controls, manages and stores information related to any inputs from one or more components of the system 102 as illustrated in FIG. 1. In various embodiments, the inputs include input data set(s) and output data set(s) of subsystems 106a-106e.

The output module 210 controls, manages and stores information related to outputs and which sends any outputs to one or more components of subsystems 106a-106e. In some embodiments, the output is a transformation(s) to be performed on a data field of an input dataset of a downstream subsystem, or a call for such a transformation The detection module 220 manages, controls, stores, and accesses information related to identifying a change in a transformation performed by an upstream subsystem. For example, the detection module 220 identifies change(s) in transformation(s) performed by upstream subsystem(s) on data field(s) of output dataset(s) of the upstream subsystem(s) and classifies the data field(s) as impacted data field(s).

The correction module 215 manages, controls, stores, and accesses information related to the topology of the data pipeline, and to the input dataset(s) of the downstream subsystem(s) comprising the impacted data field. The correction module 220 accesses topology information from the database server(s) 128 that facilitates access to a topology database(s) 130, which stores topology information of the pipeline 106. In other embodiments, the correction module 220 can be coupled to a topology cache, which stores topology information. For example, the correction module 220 identifies, based on the topology information, the subsystem(s) downstream of the upstream subsystem(s), identifies input dataset(s) of the downstream subsystem(s) including at least one of the impacted data field(s), and outputs corrective transformation(s) to he performed on the impacted data field(s) of the input dataset(s) of the downstream subsystem(s).

Figure 3:
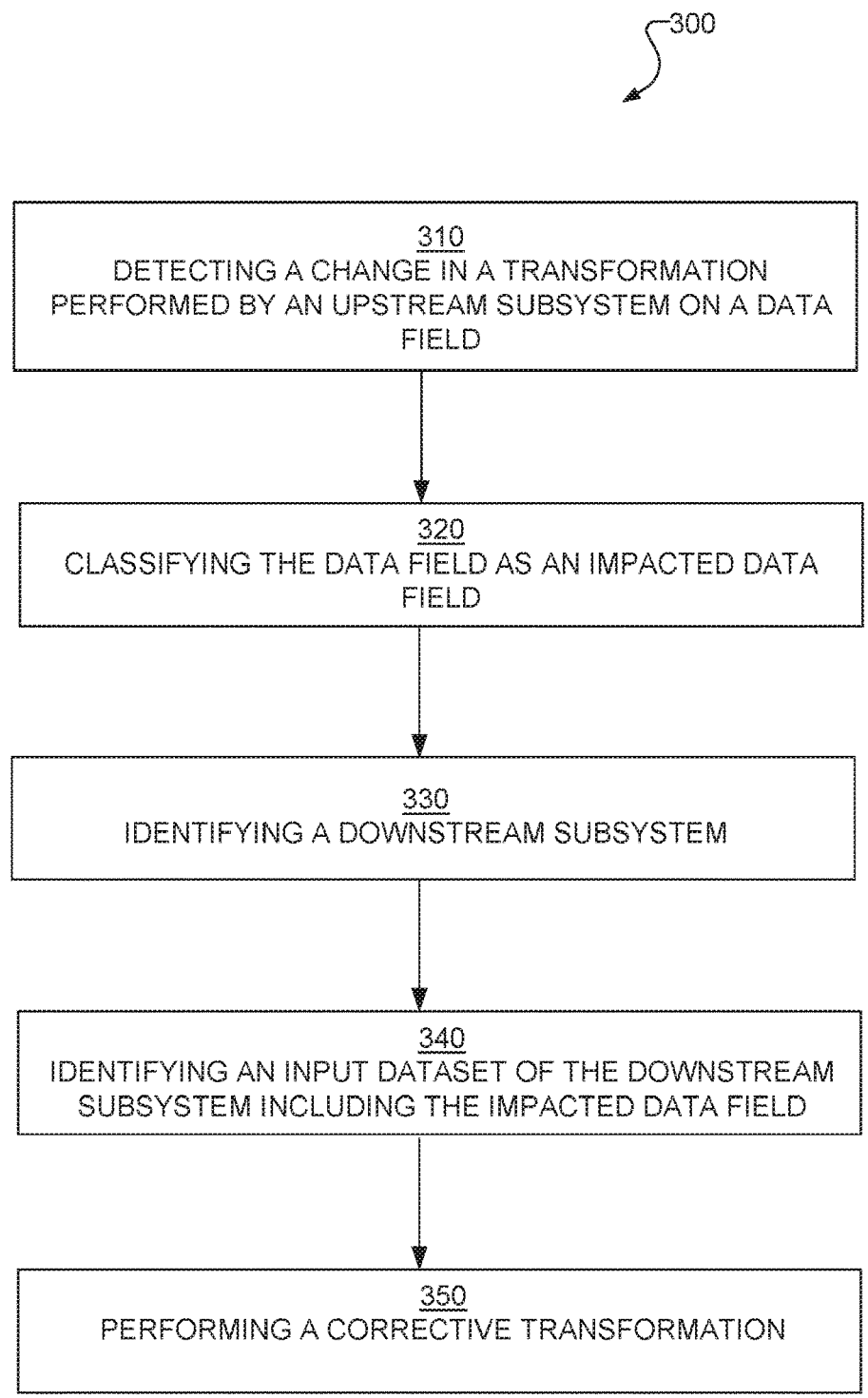
FIG. 3 is a flowchart illustrating an example method for dynamically identifying and correcting a transformation drift in a data pipeline, according to an example embodiment.

FIG. 3 is a flowchart 300 illustrating an example method for detecting and dynamically correcting a transformation drift in a data pipeline, according to an example embodiment.

At operation 310, the transformation drift engine 124 detects a change in a transformation performed by a subsystem 106b of the data pipeline on a data field of an output dataset of the subsystem 106b. This subsystem 106b is considered as an upstream subsystem. To detect a change in a transformation performed by the upstream subsystem 106*b*, the transformation drift engine 124 performs a transformation analysis. This transformation analysis may be performed periodically; or each time a new version of the data pipeline 106 is deployed. In some embodiments, the transformation drift engine 124 reads data fields of the output data set(s) and input data set(s) of the upstream subsystem 106*b* and infers the transformation(s) performed by the upstream subsystem 106*b* based on the difference between the data fields of the output data set(s) and those of the input data set(s). Based on the inferred transformation(s), the transformation drift engine 124 generates a de facto definition of the transformations performed by the upstream subsystem 106*b*. The de facto definition represents the current transformation(s) performed by the upstream subsystem 106*b*—as detected by the transformation drift engine 124. The transformation drift engine 124 accesses the transformation definition database 131 to obtain a stored definition of the transformations, which represents the transformations previously performed by the upstream subsystem 106*b*. The transformation drift engine 124 compares the de facto definition of the transformations to the stored definition of the transformations. If the comparison returns a difference between the de facto definition of stored definition of the transformations (such as an added transformation, or a suppressed transformation), the transformation drift engine 124 has detected a change in a transformation performed by the upstream subsystem 106*b* on a data field of an output dataset of the upstream subsystem 106*b*. The transformation drift engine 124 sends, to the transformation definition database 131, the de facto definition of the transformations, which represents the transformations currently performed by the subsystems, in order to update the stored definition of the transformations. The transformation definition database 131 replaces the previously stored definition of the transformations with the de facto definition of the transformations.

At a operation 320, the transformation drift engine 124 classifies the data field on which the changed transformation is performed as an impacted data field.

At operation 330, the transformation drift engine 124 identifies, based on the topology information, subsystem(s) 106*c* downstream of the upstream subsystem 106*b*. The transformation drift engine 124 accesses the topology database 130 to obtain topology information of the data pipeline 106. The transformation drift engine 124 then identifies, based on the topology information, the branches of the pipeline 106 downstream of the upstream subsystem 106*b*, and identifies the subsystem(s) 106*c* included in these branches as downstream subsystem(s).

At operation 340, the transformation drift engine 124 performs a transformation drift impact analysis. Only the subsystem(s) 106*c* downstream of the upstream subsystem 106*b* are evaluated for transformation drift impact. The other subsystems 106*d*-106*e* are considered as non-impacted by the detected transformation drift. The transformation drift engine 124 identifies the input dataset(s) of the downstream subsystem(s) 106*c* including at least one of the impacted data field(s). The transformation drift engine 124 evaluates the impact of the detected transformation drift on the impacted data field(s). A transformation drift has an impact—is material—when it changes the meaning of at least one existing field. For example, a new field masking is material if it is masking an existing field, but not if it is masking a new field. Some transformation drifts may he immaterial. For example, a transformation drift that is purely additive may be immaterial. The transformation drift engine 124 may use data profiling to evaluate whether a scripting transformation is a material transformation drift.

The transformation drift engine 124 identifies corrective transformation(s) to he performed on the impacted data field(s) of the input dataset(s) of the downstream subsystem(s) to compensate for the transformation drift. For example, if the change in the upstream transformation is an added transformation, the corrective transformation to he performed includes performing a transformation inverse to the added transformation on the impacted data field of the input dataset of the downstream subsystem 106*c*. If the change in the upstream transformation is a suppressed transformation, the corrective transformation includes performing the suppressed transformation on the impacted data field of the input dataset of the downstream subsystem 106*c*. lithe change in the upstream transformation is a field masking performed on a data field that was not previously masked, the corrective transformation includes unmasking the impacted data field in the input dataset of the downstream subsystem 106*c*. If the change in the upstream transformation is a field unmasking performed on a masked data field or the suppression of a filed masking, the corrective transformation includes masking the impacted data field in the input dataset of the downstream subsystem 106*c*. If the change in the upstream transformation is applying a mathematical function to a data field of an output dataset of an upstream subsystem, the corrective transformation includes applying the inverse of the mathematical function on the impacted data field of the input dataset of the downstream subsystem 106*c*. If the change in the upstream transformation is encrypting a data field of an output dataset of an upstream subsystem, the corrective transformation includes decrypting the impacted data field of the input dataset of the downstream subsystem 106*c*.

At operation 350, the transformation drift engine 124 performs the corrective action(s). The transformation drift engine 124 instructs the downstream subsystem(s) 106*c* to perform the corrective transformation(s) determined at operation 340. The transformation drift engine 124 may also send to the transformation definition database 131 the corrective transformation(s), in order to update the stored definition of the transformations with the corrective transformation(s). The transformation drift engine 124 may also trigger automatic reingestion of the data in the data pipeline 106 so that a clean, correct, and consistent output data set can be created. In particular, the transformation drift engine 124 may clear the downstream subsystem(s) 106*c* and restart them with new data. This can be done by deleting offset information stored for the downstream subsystem(s) 106*c*, and creating a new container to enable the downstream subsystem(s) 106*c* to store new offset information. The transformation drift engine 124 may also generate an alert and send the alert to the downstream subsystem(s) for the downstream subsystem owner to manually perform corrective actions to correct the detected transformation drift.

Computer System(s)

Figure 4:
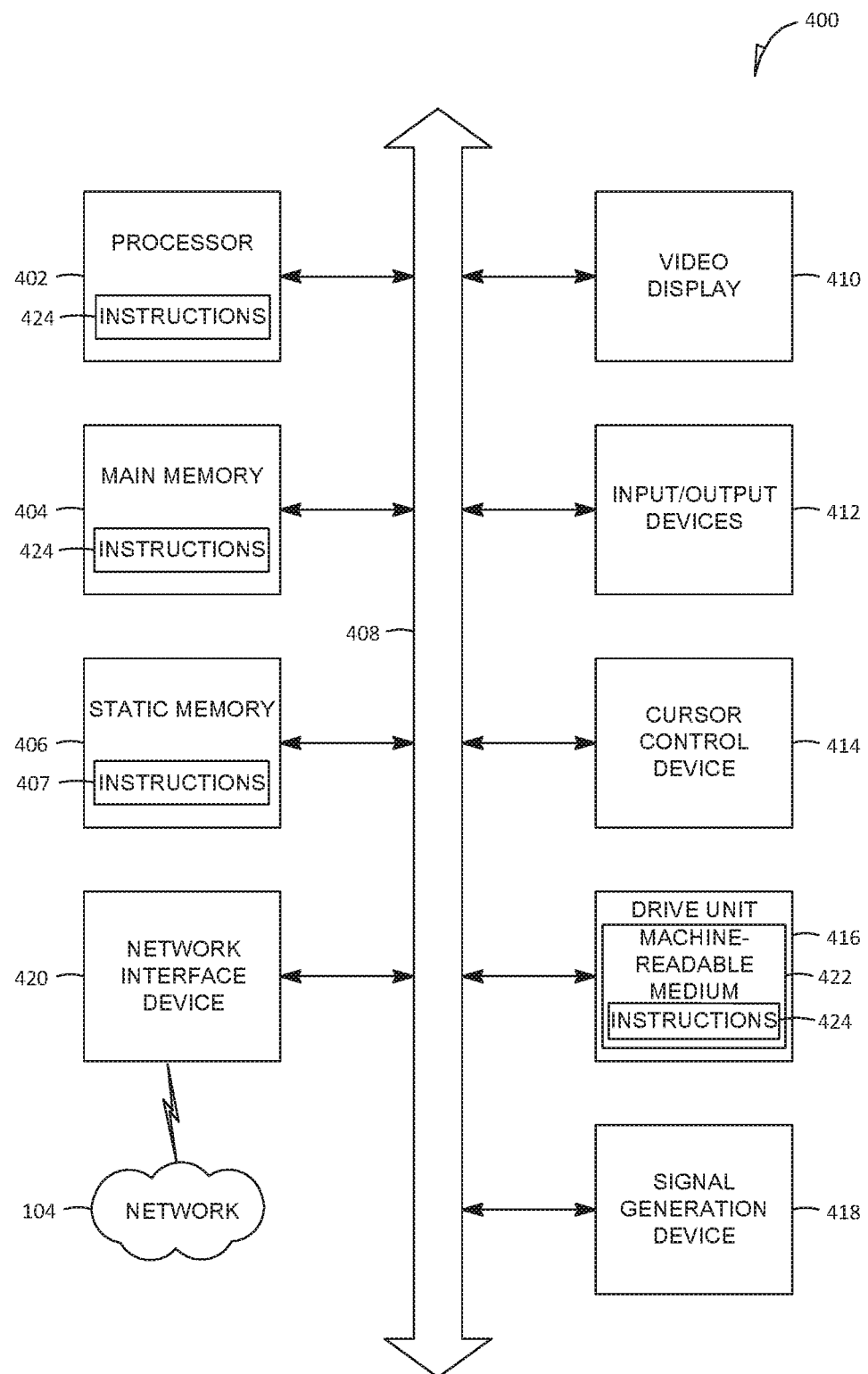
FIG. 4 shows a diagrammatic representation of a machine in the example form of a computer system within which a set of instructions, for causing the machine to perform any one or more of the methodologies discussed herein, may be executed.

FIG. 4 shows a diagrammatic representation of a machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also he taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406 (with one or more sets of instructions 407) which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a non-transitory computer-readable medium 422 on which is stored one or more sets of instructions 424 (e.g., software) embodying any one or more of the methodologies or functions described herein. The instructions 424 may also reside, completely or at least partially, within the main memory 404 and/or within the processor 402 during execution thereof by the computer system 400, the main memory 404 and the processor 402 also constituting non-transitory computer-readable media.

The instructions 424 may further be transmitted or received over a network 104 via the network interface device 420.

While not illustrated, it is understood that that computer system 400 can further include sensors that create data regarding a thermal state of the computer system 400, an orientation of the computer system 400 and a current location of the computer system 400 In various embodiments, the computer system 400 includes a temperature sensor, an accelerometer and/or a global position system for identifying the current location of the computer system 400.

While the non-transitory computer-readable medium 422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the subject matter described herein. The term "computer-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer implemented method to detect and dynamically correct a transformation drift in a data pipeline, the method comprising:
   detecting a change in a transformation performed by an upstream subsystem of the data pipeline on a data field of an output dataset of the upstream subsystem;
   classifying the data field as an impacted data field;
   identifying, based on topology information of the data pipeline, a downstream subsystem of the data pipeline, the downstream subsystem being downstream of the upstream subsystem in the data pipeline;
   identifying an input dataset of the downstream subsystem including the impacted data field; and
   automatically performing a corrective transformation on the impacted data field of the input dataset of the downstream subsystem.

2. The method of claim 1, wherein the change in the upstream transformation is an added transformation, and wherein performing a corrective transformation on the impacted data field of the input dataset of the downstream subsystem includes performing a transformation inverse to the added transformation on the impacted data field of the input dataset of the downstream subsystem.

3. The method of claim 1, wherein the change in the upstream transformation is a suppressed transformation, and wherein performing a corrective transformation on the impacted data field of the input dataset of the downstream subsystem includes performing the suppressed transformation on the impacted data field of the input dataset of the downstream subsystem of the data pipeline.

4. The method of claim 1, wherein the change in the upstream transformation is a field masking performed on a data field of an output dataset of an upstream subsystem that was not previously masked, and wherein performing a corrective transformation on the impacted data field of the input dataset of the downstream subsystem includes unmasking the impacted data field in the input dataset of the downstream subsystem.

5. The method of claim 1, wherein the change in the upstream transformation is an encryption, and wherein performing a corrective transformation on the impacted data field of the input dataset of the downstream subsystem includes decrypting the impacted data field of the input dataset of the downstream subsystem.

6. The method of claim 1, further comprising clearing and restarting the downstream subsystem.

7. The method of claim 1, further comprising generating an alert and sending the alert to the downstream subsystem.

8. A computer system to detect and dynamically correct a transformation drift in a data pipeline, the computer system comprising:

a memory to store computer executable instructions;
at least one computer processor coupled to the memory to execute the instruction, that upon execution perform operations comprising:
detecting a change in a transformation performed by an upstream subsystem of the data pipeline on a data field of an output dataset of the upstream subsystem;
classifying the data field as an impacted data field;
identifying, based on topology information of the data pipeline, a downstream subsystem of the data pipeline, the downstream subsystem being downstream of the upstream subsystem in the data pipleline;
identifying an input dataset of the downstream subsystem including the impacted data field; and
automatically performing a corrective transformation on the impacted data field of the input dataset of the downstream subsystem.

9. The system of claim 8, wherein the change in the upstream transformation is an added transformation, and wherein performing a corrective transformation on the impacted data field of the input dataset of the downstream subsystem includes performing a transformation inverse to the added transformation on the impacted data field of the input dataset of the downstream subsystem.

10. The system of claim 8, wherein the change in the upstream transformation is a suppressed transformation, and wherein performing a corrective transformation on the impacted data field of the input dataset of the downstream subsystem includes performing the suppressed transformation on the impacted data field of the input dataset of the downstream subsystem of the data pipeline.

11. The system of claim 8, wherein the change in the upstream transformation is a field masking performed on a data field of an output dataset of an upstream subsystem that was not previously masked, and wherein performing a corrective transformation on the impacted data field of the input dataset of the downstream subsystem includes unmasking the impacted data field in the input dataset of the downstream subsystem.

12. The system of claim 8, wherein the change in the upstream transformation is an encryption, and wherein performing a corrective transformation on the impacted data field of the input dataset of the downstream subsystem includes decrypting the impacted data field of the input dataset of the downstream subsystem.

13. The system of claim 8, further comprising clearing and restarting the downstream subsystem.

14. The system of claim 8, further comprising generating an alert and sending the alert to the downstream subsystem.

15. A non-transitory computer-readable medium storing instructions thereon, which when executed by a processor cause a computer system to perform operations comprising:
detecting a change in a transformation performed by an upstream subsystem of a data pipeline on a data field of an output dataset of the upstream subsystem;
classifying the data field as an impacted data field;
identifying, based on topology information of the data pipeline, a downstream subsystem of the data pipeline downstream of the upstream subsystem;
identifying an input dataset of the downstream subsystem including the impacted data field; and
performing a corrective transformation on the impacted data field of the input dataset of the downstream subsystem.

16. The computer-readable medium of claim 15, wherein the change in the upstream transformation is an added transformation, and wherein performing a corrective transformation on the impacted data field of the input dataset of the downstream subsystem includes performing a transformation inverse to the added transformation on the impacted data field of the input dataset of the downstream subsystem.

17. The computer-readable medium of claim 15, wherein the change in the upstream transformation is a suppressed transformation, and wherein performing a corrective transformation on the impacted data field of the input dataset of the downstream subsystem includes performing the suppressed transformation on the impacted data field of the input dataset of the downstream subsystem of the data pipeline.

18. The computer-readable medium of claim 15, wherein the change in the upstream transformation is a field masking performed on a data field of an output dataset of an upstream subsystem that was not previously masked, and wherein performing a corrective transformation on the impacted data field of the input dataset of the downstream subsystem includes unmasking the impacted data field in the input dataset of the downstream subsystem.

19. The computer-readable medium of claim 15, further comprising clearing and restarting the downstream subsystem.

20. The computer-readable medium of claim 15, further comprising generating an alert and sending the alert to the downstream subsystem.

* * * * *